United States Patent [19]

Okuyama et al.

[11] 4,206,395

[45] Jun. 3, 1980

[54] HARMONIC ELIMINATING APPARATUS

[75] Inventors: Toshiaki Okuyama; Hiroshi Nagase; Yuzuru Kubota, all of Hitachi; Takamasa Hori, Ibaraki, all of Japan

[73] Assignee: Hitachi, Ltd., Japan

[21] Appl. No.: 882,763

[22] Filed: Mar. 2, 1978

[30] Foreign Application Priority Data

Mar. 4, 1977 [JP] Japan .................................. 52-22653

[51] Int. Cl.² ............................................ H02P 1/04
[52] U.S. Cl. ..................................... 318/716; 318/822
[58] Field of Search ............... 318/702, 716, 718, 729, 318/821, 822, 827, 828

[56] References Cited

U.S. PATENT DOCUMENTS

| 1,477,405 | 4/1921 | Weber et al. | 318/821 |
| 1,899,719 | 2/1933 | Putman | 318/702 |
| 2,436,302 | 2/1948 | Hyde et al. | 318/729 |
| 2,508,771 | 4/1950 | Pell | 318/827 |
| 2,872,633 | 2/1959 | Schurr | 318/827 |
| 2,958,814 | 11/1960 | Foote | 318/745 |

*Primary Examiner*—Gene Z. Rubinson
*Attorney, Agent, or Firm*—Craig & Antonelli

[57] ABSTRACT

An AC motor has polyphase stator windings connected to an AC bus and has polyphase rotor windings connected directly or through impedances to capacitors. The capacitances of the capacitors are selected so as to be such that the AC motor exhibits a small input impedance for a specific frequency to be eliminated, thereby preventing the power factor from being since the fundamental frequency is not affected in any way under a light load. As a result, harmonics can be eliminated without causing any excessive AC source voltage.

12 Claims, 7 Drawing Figures

HARMONIC ELIMINATING APPARATUS

BACKGROUND OF THE INVENTION

1. FIELD OF THE INVENTION

This invention relates to a harmonic eliminating apparatus for removing and/or absorbing harmonics of AC bus voltage generated by a thyristor converter or the like.

2. DESCRIPTION OF PRIOR ART

Recently, a thyristor converter is has been widely used for controlling power supplied to a load by changing the firing angle thereof. In view of the fact that the firing angle is controlled, the current on the power supply side of the thyristor converter is greatly distorted, which causes an increase of harmonic components thereby not only reducing the power factor of the thyristor but also inducing noise interference with adjacent communication lines. A known measure for obviating this inconvenience consists in providing a filter with a static capacitor. Such a filter absorbs reactive power together with harmonics. This poses the problem of how the reactive power is to be disposed of in the case of an AC power supply having small capacity. In other words, when the load on the AC power supply changes to become small, a phase-advanced current flows in the AC power supply. As a result, the source voltage becomes excessive, which often damages the devices connected to the AC power supply.

In order to obviate this problem, a measure conventionally taken is described, for example, in the literature mentioned below.

Ivor R. Smith: "Reactive-Current Compensation by Switched Capacitors", IEEE Transactions on Industrial Electronics and Instrumentation, Vol. IECI-22, No. 1, Feb. 1975, pp. 75–78

The described measure is such that a capacitor is connected in series with a thyristor so that the capacitance of the capacitor is changed by on-off control of the thyristor. Such a measure prevents the source voltage from becoming excessive under a light load. Nevertheless, the resonance frequency of the filter also undergoes a change with a change in the capacity of the capacitor, with a result that the effect of harmonics elimination is reduced. Therefore, satisfactory elimination of harmonics is impossible.

SUMMARY OF THE INVENTION

An object of the present invention is to provide a harmonic eliminator in which the filter capacity may be reduced.

Still another object of the invention is to provide a harmonic eliminator in which the power factor at the power-receiving terminal of a load is adjustable.

According to one aspect of the present invention, an AC motor has polyphase stator windings connected to an AC bus or an AC power supply and has rotor windings connected to a filter, and the filter capacity is selected to be such a value as to reduce the primary side impedance of the AC motor with respect to a particular harmonic to be eliminated.

According to another aspect of the invention, the rotor windings of the AC motor rotating at a synchronous speed is DC-excited.

Other objects and features of the invention will become apparent from the following description.

DESCRIPTION OF THE PREFERRED EMBODIMENTS

Figure 1:
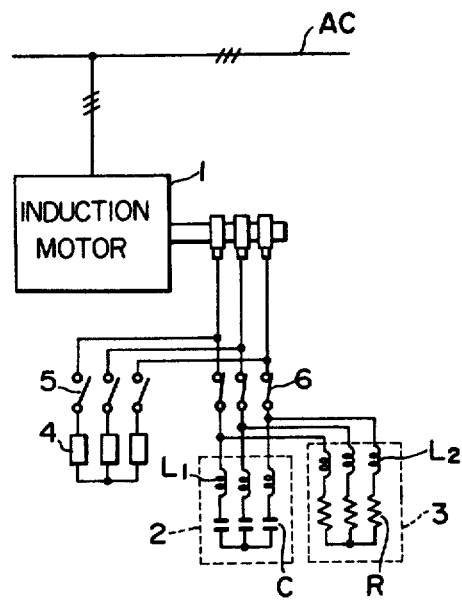
FIG. 1 is a wiring diagram showing an embodiment of the present invention.

Referring to FIG. 1 showing an embodiment of the invention, reference character AC shows a three-phase AC power supply connected to a load generating harmonics (not shown) such as a thyristor converter. Reference numeral 1 denotes a wound-rotor type three-phase induction motor with the primary or stator windings thereof connected to the AC bus or the AC power supply. Numeral 2 denotes a resonant circuit including capacitors C in series with reactors $L_1$, which resonant circuit is connected through a switch 6 to the secondary or rotor windings of the induction motor 1. The reactors $L_1$ of the resonance circuit 2 may be omitted as the case demands. Numeral 3 denotes a bypass or rotor winding current conducting circuit including reactors $L_2$ and resistors R, which circuit makes up a passage of secondary current at a slip frequency. Numeral 4 denotes starting rheostats, and numerals 5, 6 switches which are actuated in such a manner that the secondary windings are connected to the starting rheostats 4 at the time of starting the motor, while they are connected to the resonant circuit 2 as well as the bypass or rotor winding current conducting circuit 3 in normal operation.

In this configuration, the switch 5 is closed with the switch 6 retained open for starting the induction motor 1, the primary windings of which are of course connected to the AC power supply AC by a switch not shown. The motor 1 is thus accelerated to a speed approximately equal to the synchronous speed. During the acceleration, the starting rheostats 4 are continuously regulated. When acceleration to a level near the synchronous speed is attained, the switches 5 are cut off and the switches 6 are turned on for normal operation.

Figure 2:
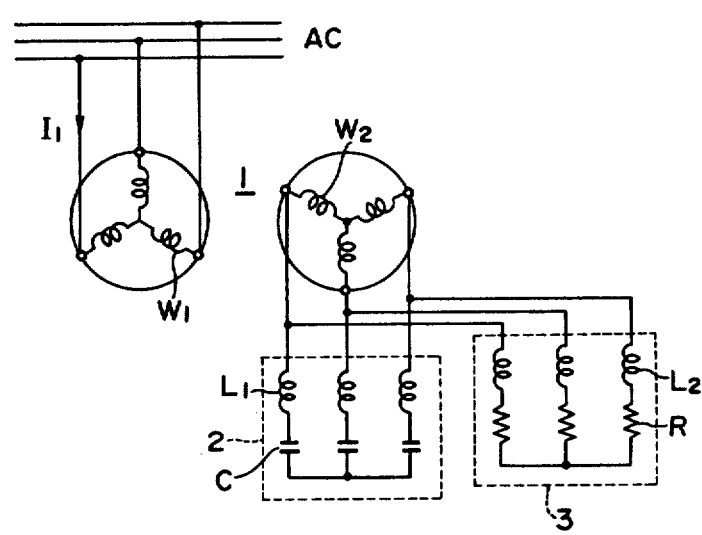
FIG. 2 is a simplified circuit diagram showing the embodiment of FIG. 1 in normal operation.

Reference will now be made to normal operation of the motor with reference to FIG. 2 showing the connection of the primary and secondary windings $w_1$ and $w_2$ of the induction motor 1 in normal operation, resonant circuit 2 and the bypass circuit 3. As described later, no substantial harmonics current flows into the bypass circuit 3, so that harmonics current, if any, may be neglected. Also, the exciting current generated in association with the harmonics is small and negligible. The primary side impedance $Z_1$ of the induction motor 1 with respect to the harmonics is expressed by the equation below.

$$Z_1 = \frac{E_1}{I_1} = (r_1 + \frac{r_2}{s}) + j\left(\omega_1(l_1 + l_2) - \frac{1}{s^2\omega_1 C}\right) \quad (1)$$

where
- $E_1$: harmonic component of the primary side phase current,
- $I_1$: harmonic component of primary side current,
- $\omega_1$: angular frequency of the harmonic,
- $r_1, r_2$: resistances of windings $w_1$ and $w_2$,
- $l_1$: impedance of the primary windings $w_1$,
- $l_2$: sum of the inductances of secondary windings $w_2$ and the reactor $L_1$,
- $C$: capacitance of the capacitor $C$, and
- $s$: slip for the harmonic.

The slip s in equation (1) is, as an example, 1.2 for the fifth harmonic of the power supply frequency at 50 Hz.

From equation (1), the resonance conditions are satisfied for a frequency $\omega_1$ when $$\omega_1 = \frac{1}{s\sqrt{(l_1 + l_2)C}} \quad (2)$$

Generally, in the case of an induction or synchronous AC motor, the following relation is observed with respect to a harmonic frequency $\omega_1$.

$$r_1 + (r_2/s) << \omega_1(l_1 + l_2) \quad (3)$$

When the resonance conditions of equation (2) are satisfied, the primary side impedance $Z_1$ is remarkably reduced as compared with the case when only the secondary windings $w_2$ are shorted.

Figure 3:
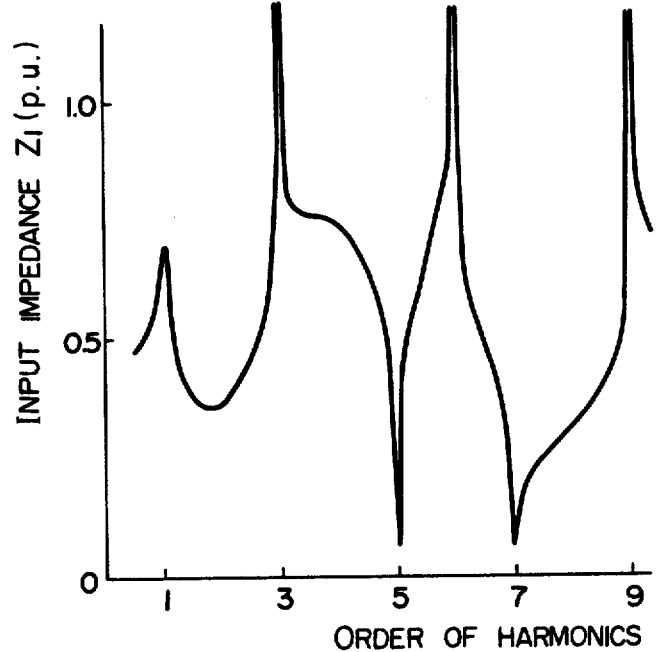
FIG. 3 is a characteristics diagram showing the relation between the impedance and the order of harmonics.

The frequency characteristics of the impedance $Z_1$ are shown in FIG. 3. Assuming that the resonance conditions of equation (2) are satisfied for the fifth harmonic, the impedance $Z_1$ for the fifth harmonic is sufficiently decreased as shown in the drawing. Under this condition, (without changing the capacitance C of the capacitor), the resonance conditions for the seventh harmonic being also satisfied, the impedance $Z_1$ for the seventh harmonic is also sufficiently reduced. The reason why the resonance conditions for harmonics of two different harmonics orders are satisfied with the same capacitance of the capacitor is that the value $s\omega_1$ remains unchanged for the fifth and seventh harmonics. For instance, $s=6/5$ and $\omega_1=5\omega_0$ ($\omega_0$: power supply frequency) for the fifth harmonic, and $s=6/7$ and $\omega_1=7\omega_0$ for the seventh harmonic. Accordingly, $s\omega_1$ is the same for both the harmonics. Therefore, it is apparent from equation (2) that the resonance conditions are established for both harmonics. Incidentally, that the impedance $Z_1$ for the third, sixth and ninth harmonics is infinite is attributed to the star connection of the primary windings of the induction motor 1.

By selecting the capacitance of the capacitor C in a manner to satisfy the resonance conditions as explained above, the fifth harmonic flows in the induction motor 1 with a small impedance and is thus eliminated. When the fifth harmonic is eliminated, the seventh harmonic is of course also eliminated as obvious from FIG. 3.

The induction motor 1, which is subjected to no-load operation, produces a torque corresponding to a mechanical loss and hence a slight slip, with a result that current associated with the slip frequency flows in the secondary windings $w_2$. The slip frequency is as low as or below 1 Hz so that it can not flow in the resonant circuit 2. The bypass or rotor winding current conducting circuit 3 is provided for permitting flow of this secondary current.

In the case where harmonics other than the fifth harmonic (including the seventh harmonic) are required to be eliminated, a resonant circuit satisfying the resonance conditions for the frequencies of such particular harmonics be may connected with the secondary windings $w_2$.

The resonance conditions are determined by the inductance of the primary and secondary windings $w_1$ and $w_2$ of the induction motor 1, the inductance of the AC power supply AC and the capacitance of the capacitor C. The inductances of the primary and secondary windings $w_1$ and $w_2$ and the AC power supply, however, usually contain some errors, i.e., deviate from the design values thereof. Preferably, therefore, the capacitance of the resonant circuit may consist of a plurality of smaller capacitances so that the overall capacitance may be adjusted by changing the number of capacitors connected to meet the practical situations.

In eliminating the harmonics in the manner mentioned above, the resonant circuit 2 is connected to the secondary windings $w_2$ only under the normal operation of the induction motor 1. In this case, only a low voltage for the slip frequency component and a voltage for the harmonic component are generated in the secondary windings $w_2$. As a result, a small installed capacity of the resonant circuit 2 is sufficient. In other words, since the AC source voltage is not directly applied to the resonant circuit 2 unlike in the conventional filter, the capacity of the resonant circuit (filter) may be considerably reduced to a smaller value than in the conventional circuit.

In this connection, only the harmonic component current flows in the resonant circuit 2, and therefore no phase-advanced current flows in the AC power supply, thus obviating the problem of increasing the source voltage.

It will be understood from the foregoing description that according to the present invention harmonics can be eliminated satisfactorily without taking into account any reactive power nor making the source voltage excessively high. Further, the voltage applied to the filter only contains a slip as small as about 0.1, so that the filter capacity is reduced.

Figure 4:
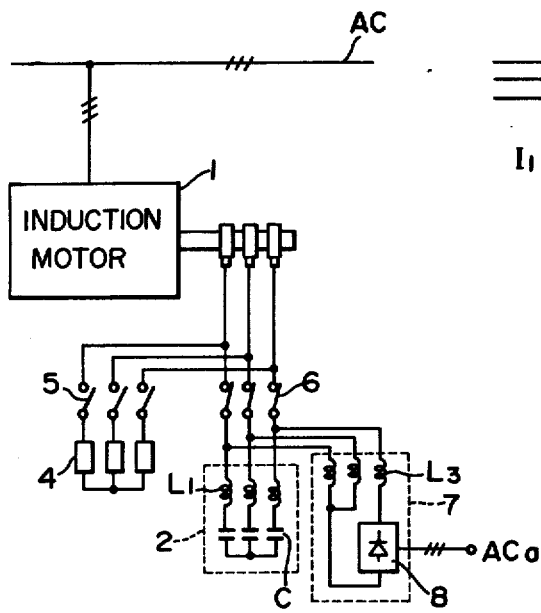
FIG. 4 is a diagram showing another embodiment of the invention.
Figure 5:
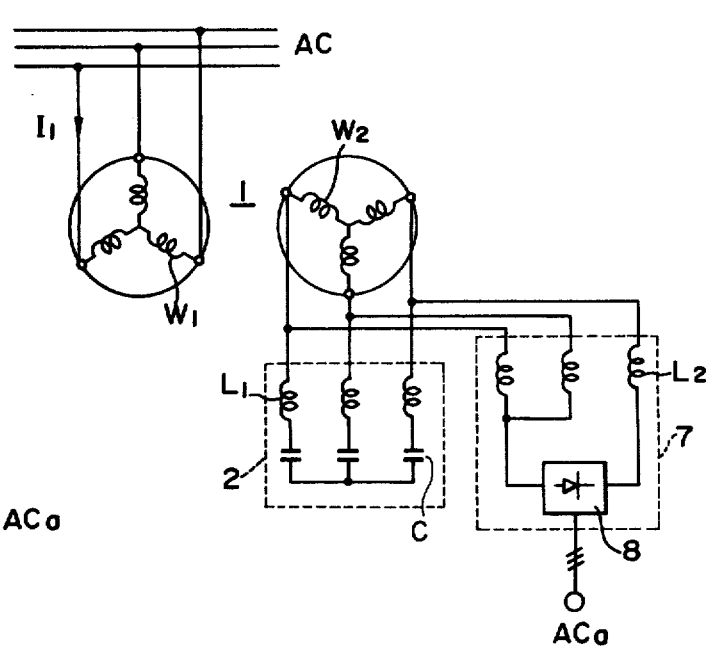
FIG. 5 is a simplified circuit diagram showing the embodiment of FIG. 4 in normal operation.

Another embodiment of the invention is shown in FIGS. 4 and 5 in which the secondary windings are adapted to be DC-excited under normal operation. In FIG. 4, like reference characters or numerals denoting like component elements in FIG. 1, numeral 7 denotes an exciting circuit including a rectifier 8 and reactors $L_3$ for blocking harmonics. Character $AC_a$ represents an exciting power supply.

In this configuration, the motor 1 is started by the starting rheostats 4 and accelerated to a level near the synchronous speed. Next, the switch 6 is turned on to DC-excite the secondary windings $w_2$ for pull-in. Thus, the induction motor 1, like the synchronous motor, enters into synchronous operation with no slip.

The only difference of this embodiment from that of FIG. 1 lies in that in the embodiment under consideration the DC current flows in the secondary windings $w_2$. The resonant circuit 2 operates in the same way to eliminate harmonics.

In this embodiment, the power factor of the AC power supply AC is also adjustable by changing the DC-exciting current of the secondary windings $w_2$. This is easily realized by employment in the rectifier circuit 8 of a thyristor means.

Figure 6:
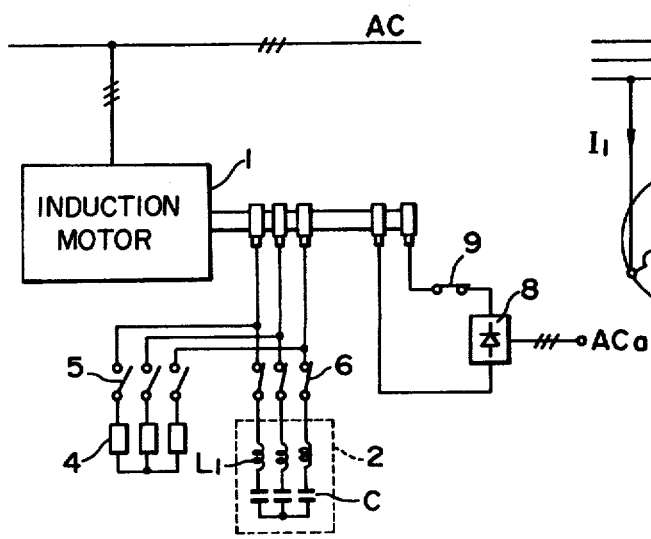
FIG. 6 is a diagram showing still another embodiment of the invention.
Figure 7:
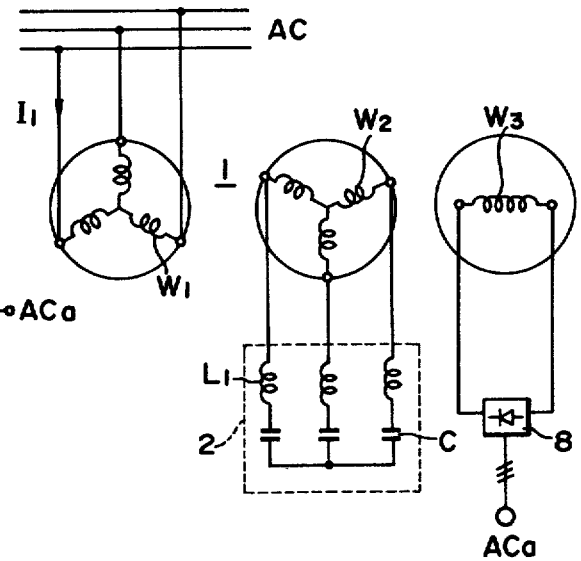
FIG. 7 is a simplified circuit diagram showing the embodiment of FIG. 6 in normal operation.

Still another embodiment of the invention is shown in FIGS. 6 and 7. In this embodiment, a single-phase exciting window $w_3$ in which a DC current flow is provided in addition to the secondary windings $w_2$ where harmonics current flows. The secondary winding $w_3$ is connected to the rectifier circuit 8 through a switch 9 which is turned on along with the switch 6 during normal operation for the DC-excitation of the winding $w_3$. Such an AC motor is known as a synchronous motor with a damper winding. It will be obvious that in this embodiment also, the resonant circuit 2 functions in the same way as those in the preceding embodiments to eliminate harmonics.

As will be understood from the foregoing description, according to the present invention, the harmonics are satisfactorily eliminated without changing the power factor of the AC power supply. Further, the filter comprises a resonant circuit connected to the rotor windings of the AC motor, thus reducing the filter capacity. Furthermore, if the rotor windings are DC-excited, the power factor of the AC power supply is also adjustable.

By the way, instead of the three-phase AC motor, a motor of a different number of phases may be used with equal effect.

Although the AC motor has a brush and a slip ring, it may be rendered brushless by relocating the resonant circuit and bypass circuit to the rotor side. In this case, the brushless DC excitation may be effected by the well known method.

We claim:

1. A harmonic eliminating process comprising:
   an AC motor having a polyphase stator winding and a polyphase rotor winding, said stator winding being connected to an AC power supply;
   means for starting and accelerating to a predetermined speed said AC motor;
   a resonant circuit connectable to said rotor winding, the resonance condition of said resonant circuit being such that the imput impedance of said AC motor with respect to those of harmonics contained in said AC power supply which are to be eliminated is minimized;
   switching means serving to connect said resonant circuit to said rotor winding when said AC motor operates at said predetermined speed; and
   a rotor winding current conducting circuit connectable to said rotor winding through said switching means for allowing electric current at a slip frequency of said AC motor to flow in said rotor winding.

2. A harmonic eliminating apparatus according to claim 1, in which said starting means includes resistors.

3. An apparatus according to claim 1 or 2, in which said resonant circuit includes star-connected series circuits each having a reactor and a capacitor.

4. An apparatus according to claim 1 or 2, in which said resonant circuit comprises star-connected capacitors.

5. A harmonic eliminating apparatus according to claim 3, in which each of said capacitors is variable.

6. A harmonic eliminating apparatus according to claim 4, in which each of said capacitors is variable.

7. A harmonic eliminating apparatus comprising:
   an induction motor having a polyphase stator winding and a polyphase rotor winding, said stator winding being connected to an AC power supply;
   means for starting and accelerating to a predetermined speed said induction motor;
   a resonant circuit connectable to said rotor winding, the resonance condition of said resonant circuit being such that the input impedance of said induction motor with respect to those of harmonics contained in said AC power supply which are to be eliminated is minimized;
   switching means serving to connect said resonant circuit to said rotor winding when said induction motor operates at said predetermined speed; and
   a rotor winding current conducting circuit connectable to said rotor winding through said switching means for allowing electric current at a slip frequency of said induction motor to flow in said rotor winding, said current conducting circuit including star-connected series circuits each having a resistor and a reactor.

8. A harmonic eliminating apparatus comprising:
   a synchronous induction motor having a polyphase stator winding and a polyphase rotor winding, said rotor winding being connected to an AC power supply;
   means for starting and accelerating to a predetermined speed said synchronous induction motor;
   a resonant circuit connectable to said rotor winding, the resonance condition of said resonant circuit being such that the input impedance of said synchronous induction motor with respect to those of harmonics contained in said power supply which are to be eliminated is minimized;
   switching means for serving to connect said resonant circuit to said rotor winding when said synchronous induction motor operates at said predetermined speed; and
   exciting means connectable to said rotor winding through said switching means for DC-wise exciting said rotor winding when said synchronous induction motor operates at said predetermined speed.

9. A harmonic eliminating apparatus according to claim 8, in which said exciting means includes a rectifier for rectifying an alternating current and a reactor connected to the output of said rectifier for preventing higher harmonics from flowing in said rectifier.

10. A harmonic eliminating apparatus according to claim 9, in which said rectifier is a controllable rectifier capable of delivering a controlled DC output current.

11. A harmonic eliminating apparatus comprising:
   a synchronous motor having a polyphase stator winding and a rotor winding, said rotor winding including polyphase winding unit and a single-phase winding unit, said stator winding being connected to an AC power supply;
   means for starting and accelerating to a predetermined speed said synchronous motor;
   a resonant circuit connectable to said rotor winding, the resonance condition of said resonant circuit being such that the input impedance of said synchronous motor with respect to those of harmonics contained in said power supply which are to be eliminated is minimized;
   switching means for serving to connect said resonant circuit to said rotor winding when said synchronous motor operates at said predetermined speed; and exciting means connectable to said rotor winding through said switching means for DC-wise exciting said single-phase winding unit when said synchronous motor operates at said predetermined speed.

12. A harmonic eliminating apparatus according to claim 11, in which said exciting means includes means for adjusting the DC current to be supplied to said single-phase winding unit of said rotor winding.

* * * * *